US009146746B2

(12) United States Patent
Ceze et al.

(10) Patent No.: US 9,146,746 B2
(45) Date of Patent: Sep. 29, 2015

(54) SYSTEMS AND METHODS FOR PROVIDING DETERMINISTIC EXECUTION

(75) Inventors: Luis Henrique Ceze, Seattle, WA (US);
Thomas Bergan, Seattle, WA (US);
Joseph Devietti, Camarillo, CA (US);
Daniel Joseph Grossman, Seattle, WA (US); Jacob Eric Nelson, Seattle, WA (US)

(73) Assignee: University of Washington through its Center of Commercialization, Seattle, WA (US)

( * ) Notice: Subject to any disclaimer, the term of this patent is extended or adjusted under 35 U.S.C. 154(b) by 248 days.

(21) Appl. No.: 13/410,212

(22) Filed: Mar. 1, 2012

(65) Prior Publication Data
US 2012/0226868 A1 Sep. 6, 2012

Related U.S. Application Data

(60) Provisional application No. 61/448,010, filed on Mar. 1, 2011.

(51) Int. Cl.
*G06F 12/08* (2006.01)
*G06F 9/38* (2006.01)
*G06F 9/52* (2006.01)

(52) U.S. Cl.
CPC .............. *G06F 9/3851* (2013.01); *G06F 9/522* (2013.01)

(58) Field of Classification Search
CPC .......................... G06F 12/0831; G06F 12/0817
USPC .......................................................... 711/145
See application file for complete search history.

(56) References Cited

U.S. PATENT DOCUMENTS

2003/0163648 A1* 8/2003 Smith ........................... 711/145
2009/0235262 A1* 9/2009 Ceze et al. .................... 718/102
2010/0318703 A1* 12/2010 Zhu et al. ...................... 710/105

OTHER PUBLICATIONS

Adve, S.V., and M.D. Hill, "Weak Ordering—A New Definition," ACM SIGARCH Computer Architecture News—Special Issue: Proceedings of the 17th Annual International Symposium on Computer Architecture (ISCA) 18(3a):2-14, Jun. 1990.
Altekar, G., and I. Stoica, "ODR: Output-Deterministic Replay for Multicore Debugging," Proceedings of the 22nd ACM Symposium on Operating Systems Principles (SOSP), Big Sky, Montana, Oct. 11-14, 2009, pp. 193-206.
Aviram, A., et al., "Efficient System-Enforced Deterministic Parallelism," Communications of the ACM (Association for Computing Machinery) 55(5):111-119, May 2012.

(Continued)

*Primary Examiner* — Yong Choe
(74) *Attorney, Agent, or Firm* — Christensen O'Connor Johnson Kindness PLLC

(57) ABSTRACT

Devices and methods for providing deterministic execution of multithreaded applications are provided. In some embodiments, each thread is provided access to an isolated memory region, such as a private cache. In some embodiments, more than one private cache are synchronized via a modified MOESI coherence protocol. The modified coherence protocol may be configured to refrain from synchronizing the isolated memory regions until the end of an execution quantum. The execution quantum may end when all threads experience a quantum end event such as reaching a threshold instruction count, overflowing the isolated memory region, and/or attempting to access a lock released by a different thread in the same quantum.

20 Claims, 6 Drawing Sheets

(56) References Cited

OTHER PUBLICATIONS

Bergan, T., et al., "CoreDet: A Compiler and Runtime System for Deterministic Multithreaded Execution," ACM SIGARCH Computer Architecture News—ASPLOS '10, 38(1):53-64, Mar. 2010.
Bergan, T., et al., "Deterministic Process Groups in dOS," Proceedings of the 9th USENIX Conference on Operating Systems Design and Implementation (OSDI '10), Vancouver, Canada, Oct. 4-6, 2010, 15 pages.
Berger, E.D., et al., "Grace: Safe and Efficient Concurrent Programming" Proceedings of the 24th ACM SIGPLAN Conference on Object-Oriented Programming, Systems, Languages, and Applications (OOPSLA '09), Orlando, Fla., Oct. 25-29, 2009, 10 pages.
Blelloch, G.E., "NESL: A Nested Data-Parallel Language (Version 3.1)," Technical Report, Carnegie Mellon University, School of Computer Science, Pittsburgh, Sep. 1995, 65 pages.
Bocchino, R.L., Jr., et al., "A Type and Effect System for Deterministic Parallel Java," Proceedings of the 24th ACM SIGPLAN Conference on Object-Oriented Programming, Systems, Languages, and Applications (OOPSLA '09), Orlando, Fla., Oct. 25-29, 2009, pp. 97-116.
Chakravarty, M.M.T., et al., "Data Parallel Haskell: A Status Report," Proceedings of the Workshop on Declarative Aspects of Multicore Programming (DAMP '07), Nice, France, Jan. 16, 2007, pp. 10-18.
Cui, H., et al., "Stable Deterministic Multithreading Through Schedule Memoization," Proceedings of the 9th USENIX Conference on Operating Systems Design and Implementation (OSDI '10), Vancouver, Canada, Oct. 4-6, 2010, 15 pages.
Devietti, J., et al., "DMP: Deterministic Shared Memory Multiprocessing," Proceedings of the 14th International Conference on Architectural Support for Programming Languages and Operating Systems (ASPLOS '09), Washington, D.C., Mar. 7-11, 2009, pp. 85-96.
Dubois, M., et al., "Delayed Consistency and Its Effects on the Miss Rate of Parallel Programs," Proceedings of the ACM/IEEE Conference on Supercomputing, Albuquerque, N.M., Nov. 18-22, 1991, pp. 197-206.
Edwards, S.A., and O. Tardieu, "SHIM: A Deterministic Model for Heterogeneous Embedded Systems,"Proceedings of the 5th ACM International Conference on Embedded Software (EMSOFT '05), Jersey City, N.J., Sep. 18-22, 2005, pp. 264-272.
Gharachorloo, K., et al., "Memory Consistency and Event Ordering in Scalable Shared-Memory Multiprocessors,"ACM SIGARCH Computer Architecture News—Special Issue: Proceedings of the 17th Annual International Symposium on Computer Architecture (ISCA) 18(3a):2-14, Jun. 1990.
Hower, D.R., and M.D. Hill, "ReRun: Exploiting Episodes for Lightweight Memory Race Recording," Proceedings of the 35th Annual International Symposium on Computer Architecture (ISCA '08), Beijing, Jun. 21-25, 2008, pp. 265-276.
Hower, D.R., et al., "Calvin: Deterministic or Not? Free Will to Choose," Proceedings of the IEEE 17th International.Symposium on High Performance Computer Architecture (HPCA '11), San Antonio, Tex., Feb. 12-16, 2011, pp. 333-334.
Montesinos, P., et al., "DeLorean: Recording and Deterministically Replaying Shared-Memory Multiprocessor Execution Efficiently," Proceedings of the 35th Annual International Symposium on Computer Architecture (ISCA), Beijing, Jun. 21-25, 2008, pp. 289-300.
Narayanasamy, S., et al., "Recording Shared Memory Dependencies Using Strata," Proceedings of the 12th International Conference on Architectural Support for Programming Languages and Operating Systems (ASPLOS '06), San Jose, Calif., Oct. 21-25, 2006, pp. 229-240.
Netzer, R.H.B., "Optimal Tracing and Replay for Debugging Shared-Memory Parallel Programs," Proceedings of the ACM/ONR Workshop on Parallel and Distributed Debugging (PADD '93), San Diego, May 17-19, 1993, pp. 1-11.
Olszewski, M., et al., "Kendo: Efficient Deterministic Multithreading in Software," Proceedings of the 14th International Conference on Architectural Support for Programming Languages and Operating Systems (ASPLOS '09), Washington, D.C., Mar. 7-11, 2009, pp. 97-108.
Park, S., et al., "PRES: Probabilistic Replay With Execution Sketching on Multiprocessors," Proceedings of the ACM SIGOPS 22nd Symposium on Operating Systems Principles (SOSP '09), Big Sky, Mont., Oct. 11-14, 2009, pp. 177-191.
Rinard, M.C., and M.S. Lam, "The Design, Implementation, and Evaluation of Jade," ACM Transactions on Programming Languages and Systems (TOPLAS) 20(3):483-545, May 1998.
Thies, W., et al., "StreamIt: A Language for Streaming Applications," Proceedings of the 11th International Conference on Compiler Construction (CC '02), Grenoble, France, Apr. 2002, pp. 179-196.
Von Praun, C., et al., "Conditional Memory Ordering," Proceedings of the 33rrd Annual International Symposium on Computer Architecture (ISCA '06), Boston, Jun. 17-21, 2006, pp. 41-52.
Xu, M., et al., "A 'Flight Data Recorder' for Enabling Full-System Multiprocessor Deterministic Replay," Proceedings of the 30th Annual International Symposium on Computer Architecture (ISCA '03), San Diego, Jun. 9-11, 2003, pp. 122-135.
Xu, M., et al., "A Regulated Transitive Reduction (RTR) for Longer Memory Race Recording," Proceedings of the 12th International Conference on Architectural Support for Programming Languages and Operating Systems (ASPLOS '06), San Jose, Calif., Oct. 21-25, 2006, pp. 49-60.
Berger, E.D., et al., "Grace: Safe Multithreaded Programming for C/C++," Proceedings of the 24th ACM SIGPLAN Conference on Object-Oriented Programming, Systems, Languages, and Applications (OOPSLA '09), Orlando, Fla., Oct. 25-29, 2009, 16 pages.
Adl-Tabatabai, A.-R., et al., "Compiler and Runtime Support for Efficient Software Transactional Memory," Proceedings of the ACM SIGPLAN Conference on Programming Language Design and Implementation (PLDI '06), Ottawa, Jun. 10-16, 2006; ACM SIGPLAN Notices 41(6):26-37, Jun. 2006.
Aviram, A., et al., "Efficient System-Enforced Deterministic Parallelism," Communications of the ACM 55(5):111-119, May 2012.
Bergan, T., et al., "CoreDet: A Compiler and Runtime System for Deterministic Multithreaded Execution," Proceedings of the 15th International Conference on Architectural Support for Programming Languages and Operating Systems (ASPLOS '10), Pittsburgh, Mar. 13-17, 2010; ACM SIGPLAN Notices 45(3):53-64, Mar. 2010.
Berger, E.D., et al., "Hoard: A Scalable Memory Allocator for Multithreaded Applications," Proceedings of the 9th International Conference on Architectural Support for Programming Languages and Operating Systems (ASPLOS 2000), Cambridge, Mass., Nov. 13-15, 2000; ACM SIGPLAN Notices 35(11):117-128, Nov. 2000.
Bienia, C., et al., "The PARSEC Benchmark Suite: Characterization and Architectural Implications," Princeton University Technical Report TR-811-08, Jan. 2008, pp. 1-22.
Boehm, H.-J., "Threads Cannot Be Implemented as a Library," Proceedings of the ACM SIGPLAN Conference on Programming Language Design and Implementation (PLDI '05), Chicago, Jun. 12-15, 2005; ACM SIGPLAN Notices 40(6):261-268, Jun. 2005.
Boehm, H.-J., and S.V. Adve, "Foundations of the C++ Concurrency Memory Model," Proceedings of the ACM SIGPLAN Conference on Programming Language Design and Implementation (PLDI '08), Tucson, Ariz., Jun. 7-13, 2008; ACM SIGPLAN Notices 43(6):68-78, Jun. 2008.
Ceze, L., et al., "BulkSC: Bulk Enforcement of Sequential Consistency," Proceedings of the 34th Annual International Symposium on Computer Architecture (ISCA '07), San Diego, Jun. 9-13, 2007, 12 pages.
Choi, J.-D., and H. Srinivasan, "Deterministic Replay of Java Multithreaded Applications," Proceedings of the 2nd SIGMETRICS Symposium on Parallel and Distributed Tools (SPDT '98), Welches, Ore., Aug. 3-4, 1998, pp. 48-59.
Devietti, J., et al., "DMP: Deterministic Shared Memory Multiprocessing," Proceedings of the 14th International Conference on Architectural Support for Programming Languages and Operating Systems (ASPLOS '09), Washington, D.C., Mar. 7-11, 2009; ACM SIGPLAN Notices 44(3):85-96, Mar. 2009.
Devietti, J., et al., "RCDC: A Relaxed Consistency Deterministic Computer," Proceedings of the 16th International Conference on

(56) References Cited

OTHER PUBLICATIONS

Architectural Support for Programming Languages and Operating Systems (ASPLOS '11), Newport Beach, Calif., Mar. 5-11, 2011; ACM SIGPLAN Notices 46(3):67-78, Mar. 2011.

Dubois, M., et al., "Delayed Consistency and Its Effects on the Miss Rate of Parallel Programs," Proceedings of the ACM/IEEE Conference on Supercomputing, Albuquerque, N.M., Nov. 18-22, 1991, 10 pages.

Dubois, M., et al., "Memory Access Buffering in Multiprocessors," Proceedings of the 13th Annual International Symposium on Computer Architecture (ISCA '86), Tokyo, Jun. 3-5, 1986, pp. 434-442.

Gniady, C., et al., "Is SC + ILP = RC?" Proceedings of the 26th International Symposium on Computer Architecture (ISCA '99), Atlanta, May 1-4, 1999, 10 pages.

Hill, M.D., and M. Xu, "Racey: A Stress Test for Deterministic Execution," Computer Sciences Department, University of Wisconsin-Madison, Jan. 2009, <http://www.cs.wisc.edu/~markhill/racey.html> [retrieved Nov. 3, 2014], 2 pages.

Lattner, C., "Macroscopic Data Structure Analysis and Optimization," Doctoral Dissertation, University of Illinois at Urbana-Champaign, 2005, 225 pages.

Lattner, C., and V. Adve, "LLVM: A Compilation Framework for Lifelong Program Analysis & Transformation," Proceedings of the 10th International Symposium on Code Generation and Optimization (CGO '12), San Jose, Calif., Mar. 31-Apr. 4, 2012, 12 pages.

LeBlanc, T.J., and J.M. Mellor-Crummey, "Debugging Parallel Programs With Instant Replay," IEEE Transactions on Computers C-36(4):471-482, Apr. 1987.

Luk, C.-K., et al., "Pin: Building Customized Program Analysis Tools With Dynamic Instrumentation," Proceedings of the ACM SIGPLAN Conference on Programming Language Design and Implementation (PLDI '05), Chicago, Jun. 12-15, 2005; ACM SIGPLAN Notices 40(6):180-189, Jun. 2005.

Manson, J., and W. Pugh, "The Java Memory Model," PowerPoint presentation, University of Maryland, College Park, 2004, 77 pages.

Mellor-Crummey, J.M., and M.L. Scott, "Algorithms for Scalable Synchronization on Shared-Memory Multiprocessors," ACM Transactions on Computer Systems 9(1):21-65, Feb. 1991.

Mellor-Crummey, J.M., and T.J. LeBlanc, "A Software Instruction Counter," Proceedings of the 3rd International Conference on Architectural Support for Programming Languages and Operating Systems (ASPLOS III), Boston, Apr. 3-6, 1989, 9 pages.

Musuvathi, M., et al., "Finding and Reporting Heisenbugs in Concurrent Programs," Proceedings of the 8th USENIX Symposium on Operating Systems Design and Implementation, San Diego, Dec. 8-10, 2008, pp. 267-280.

Ousterhout, J.K., "Scheduling Techniques for Concurrent Systems," Proceedings of the 3rd International Conference on Distributed Computer Systems, Oct. 18-22, 1982, Miami/Ft. Lauderdale, Fla., 9 pages.

Reinhardt, S.K., et al., "The Wisconsin Wind Tunnel: Virtual Prototyping of Parallel Computers," Technical Report 1122a, Computer Sciences Department, University of Wisconsin-Madison, Jan. 1993, 13 pages.

Ronsse, M., and K. De Bosschere, "RecPlay: A Fully Integrated Practical Record/Replay System," ACM Transactions on Computer Systems 17(2):133-152, May 1999.

Russell, K., and D. Detlefs, "Eliminating Synchronization-Related Atomic Operations With Biased Locking and Bulk Rebiasing," Proceedings of the 21st ACM SIGPLAN Conference on Object-Oriented Programming, Systems, Languages, and Applications (OOPSLA '06), Portland, Ore., Oct. 22-26, 2006, 9 pages.

Scales, D.J., et al., "Shasta: A Low Overhead, Software-Only Approach for Supporting Fine-Grain Shared Memory," WRL Research Report 96/2, Western Research Laboratory, Palo Alto, Calif., Nov. 1996, 29 pages.

Vallejo, E., et al., "Implementing Kilo-Instruction Multiprocessors," Proceedings of the International Conference on Pervasive Services (ICPS '05), Santorini, Greece, Jul. 11-14, 2005, 12 pages.

Wenisch, T.F., et al., "Mechanisms for Store-Wait-Free Multiprocessors," Proceedings of the 34th Annual International Symposium on Computer Architecture (ISCA '07), San Diego, Jun. 9-13, 2007, 12 pages.

Woo, S.C., et al., "The SPLASH-2 Programs: Characterization and Methodological Considerations," Proceedings of the 22nd Annual International Symposium on Computer Architecture (ISCA '95), S. Margherita Ligure, Italy, Jun. 22-24, 1995, 13 pages.

\* cited by examiner

SYSTEMS AND METHODS FOR PROVIDING DETERMINISTIC EXECUTION

CROSS-REFERENCE TO RELATED APPLICATION

This application claims the benefit of Provisional Application No. 61/448,010, filed Mar. 1, 2011, the entire disclosure of which is hereby incorporated by reference herein for all purposes.

STATEMENT OF GOVERNMENT LICENSE RIGHTS

This invention was made with government support under CCF-0846004 awarded by National Science Foundation. The government has certain rights in the invention

BACKGROUND

Multithreaded programs, even if given the exact same input, may not produce the same output due to a variety of factors such as timing differences, inter-thread communication, and/or the like. Such nondeterminism in systems with multiple execution pipelines may severely complicate testing, debugging, and deployment of multithreaded programs. For example, even if a bug can be identified, it may be difficult to reproduce the buggy behavior if the behavior only occurs intermittently. As another example, there are no guarantees that a nondeterministic multithreaded program will perform the same way as tested once it is deployed.

While some attempts have been made to produce systems that execute multithreaded programs in a deterministic manner, each of the prior systems have shortcomings. In some previous attempts, speculation schemes are required, which add a great deal of complexity to the hardware required for implementation. In other previous attempts, multiple threads have been serialized, which has a negative effect on performance. What is needed are systems and methods for deterministic execution of multithreaded programs that have low hardware complexity yet are able to provide highly efficient performance.

SUMMARY

This summary is provided to introduce a selection of concepts in a simplified form that are further described below in the Detailed Description. This summary is not intended to identify key features of the claimed subject matter, nor is it intended to be used as an aid in determining the scope of the claimed subject matter.

In some embodiments, a computer-implemented method of deterministic multithreaded execution is provided. The method comprises executing one or more threads via one or more execution pipelines, wherein each thread is configured to access an isolated memory region, and, in response to determining that all of the one or more threads have detected end of execution quantum events, synchronizing the isolated memory regions. In some embodiments, a physical computer-readable medium having computer-executable instructions stored thereon is provided, wherein the instructions, if executed by one or more processors of a computing device, cause the computing device to perform such a method.

In some embodiments, a computing device configured to deterministically execute multiple concurrent threads is provided. The computing device comprises a set of isolated memory regions, at least one execution pipeline, and a physical computer-readable medium having computer-executable instructions stored thereon. Each execution pipeline of the at least one execution pipelines is associated with an isolated memory region of the set of isolated memory regions. In response to execution by the computing device, the computer-executable instructions cause the computing device to provide an isolated memory space monitor, an instruction count monitor, and a deterministic synchronization library. The isolated memory space monitor is configured to detect a state wherein at least one isolated memory region is full. The instruction count monitor is configured to detect execution of a predetermined number of processing instructions by a thread. The deterministic synchronization library is configured to detect a request by a thread for a lock previously released by a different thread during an execution quantum.

DESCRIPTION OF THE DRAWINGS

The foregoing aspects and many of the attendant advantages of this invention will become more readily appreciated as the same become better understood by reference to the following detailed description, when taken in conjunction with the accompanying drawings, wherein.

DETAILED DESCRIPTION

In some embodiments of the present disclosure, relaxed memory consistency may be used to provide deterministic execution while also providing high performance with little hardware complexity. Embodiments of the present disclosure do not use speculation, and do not sacrifice determinism in the presence of data races. While some embodiments of the present disclosure may be implemented solely in software, in some embodiments, a low complexity hybrid hardware/software implementation may be used. In hybrid embodiments, the hardware may provide software-controlled store buffering and instruction counting, while the remainder of the functionality is provided in software. In some embodiments, the system and methods may be implemented using commodity multiprocessor architectures, and may not interfere with software that does not choose to use it.

Figure 1:
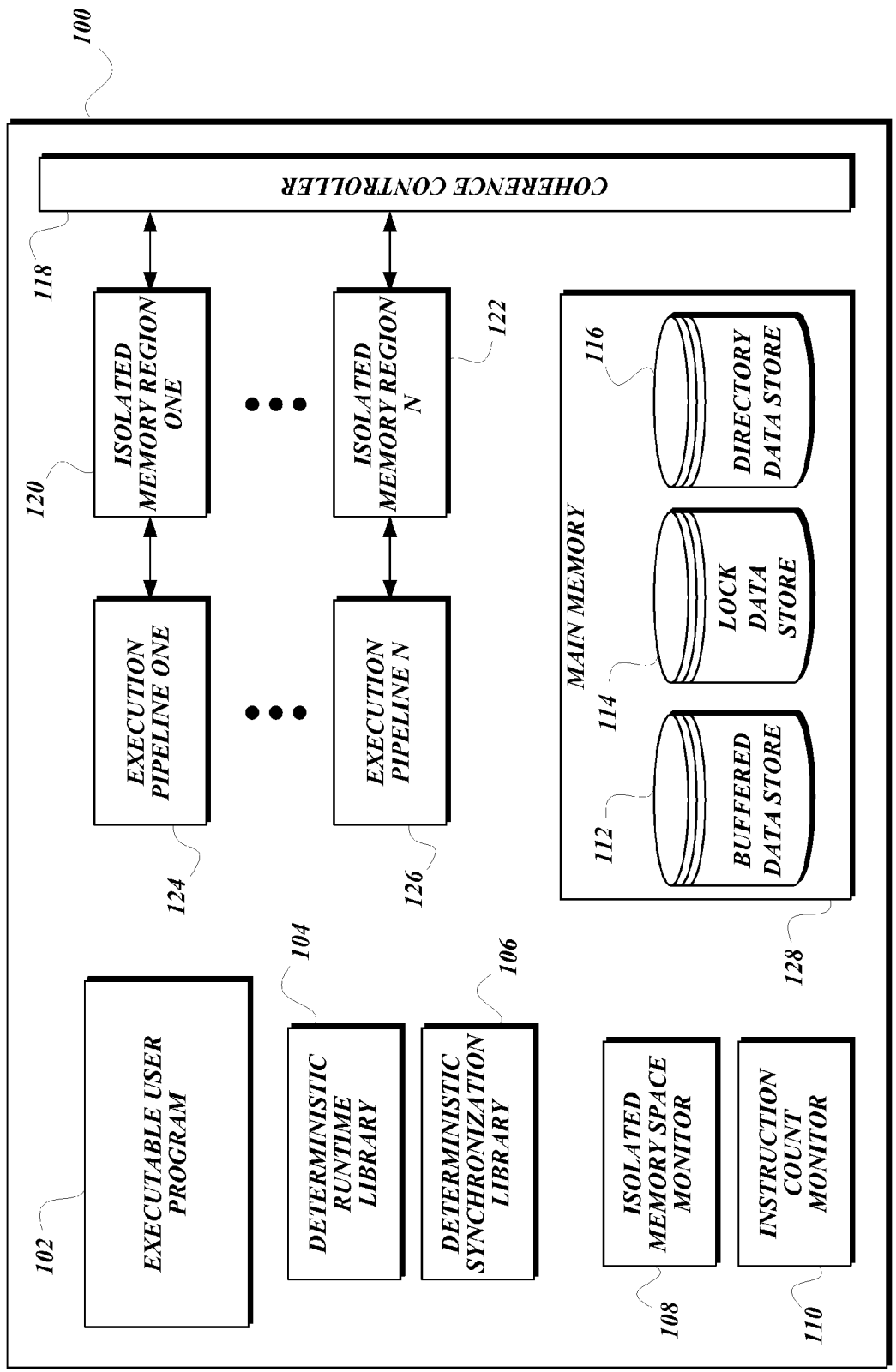
FIG. 1 illustrates an exemplary embodiment of a computing device configured to provide deterministic execution of multithreaded programs according to various aspects of the present disclosure.

FIG. 1 illustrates an exemplary embodiment of a computing device 100 configured to provide deterministic execution of multithreaded programs according to various aspects of the present disclosure. In some embodiments, the computing device 100 may be a desktop computer, and may include other components typically associated with a desktop computer but not illustrated herein, such as a display adapter, a network adapter, a keyboard interface, a mouse interface, and/or the like. In other embodiments, the computing device 100 may be any other type of computing device suitable for executing multithreaded programs, such as a server computer, a laptop computer, a tablet computer, a smartphone, and/or the like.

In some embodiments, the computing device 100 may include one or more execution pipelines 124-126. As understood by one of ordinary skill in the art, each execution pipeline is configured to execute a thread, wherein the thread comprises a series of computer-executable instructions. At some points, the discussion below may refer to a thread itself taking action. One of ordinary skill in the art will understand that this metonymy is used for ease of discussion, and refers to actions that take place through the execution of computer-executable instructions associated with the thread by an execution pipeline.

Each execution pipeline of the one or more execution pipelines 124-126 may concurrently execute separate threads. In some embodiments, a processor may be configured to provide a single execution pipeline, and the one or more execution pipelines 124-126 may be provided by including multiple processors in the computing device 100. In some embodiments, a single processor may include a single processing core configured to provide multiple execution pipelines, such as via simultaneous multithreading and/or the like. In some embodiments, a single processor may include multiple processing cores, each processing core configured to provide one or more execution pipelines. In some embodiments, combinations of these various techniques may be used within a single computing device 100.

The computing device 100 may include main memory 128 such as RAM and/or the like. Further, each execution pipeline 124-126 may be associated with an isolated memory region 120-122 which provides local storage for the execution pipeline. For example, isolated memory region one 120 provides storage for execution pipeline one 124, and so on. The memory regions are "isolated" because only execution pipeline one 124 is configured to access isolated memory region one 120, and so on. The isolated memory regions 120-122 may be configured to act as cache memories. For example, in response to a request to access a location in main memory 128, execution pipeline one 124 may first check isolated memory region one 120 to see if data from the location in main memory 128 has been previously retrieved and stored in isolated memory region one 120.

In some embodiments, the isolated memory regions 120-122 may be processor cache memories such as L1 cache memories associated with the execution pipelines 124-126. In some embodiments, the isolated memory regions 120-122 may be isolated portions of main memory 128 or some other storage medium. In some embodiments, a combination of hardware-managed isolated memory regions (such as L1 caches) and software-managed isolated memory regions (such as isolated portions of main memory 128) may both be used. For example, in embodiments configured to execute more threads than there are execution pipelines, hardware-managed isolated memory regions may be used for threads that are currently undergoing execution by an execution pipeline, while software-managed isolated memory regions may be used for threads that are not currently undergoing execution by an execution pipeline.

In some embodiments, each cache line of the isolated memory regions 120-122 may be augmented to include a write mask. The write mask may include one bit for each byte in the cache line to store information regarding which bytes have been changed during a "BufferedStore" operation, which is described further below.

In some embodiments, the computing device 100 may include a buffered data store 112, a lock data store 114, and/or a directory data store 116. The data stored within these data stores may be stored in any suitable format, and are described further below. Though illustrated as being stored within main memory 128, one or more of these data stores may be located in any other computer-readable storage location associated with the computing device 100. For example, while the buffered data store 112 is illustrated within main memory 128 and separate from the directory data store 116, in some embodiments, the buffered data store 112 may include portions that reside in hardware-based isolated memory regions 120-122 such as private processor caches, and portions that reside in the directory data store 116. The buffered data store 112 may also include portions that reside in main memory 128 for software-based isolated memory regions. The buffered data store 112 is configured to store data in response to "BufferedStore" instructions, as discussed further below. The lock data store 114 is configured to store information regarding which thread last released a given lock, and during what execution quantum it was released. The directory data store 116 is configured to store information usable by the coherence controller 118 to help synchronize the isolated memory regions 120-122.

In some embodiments, the executable user program 102 may be modified either at compile time or via binary rewriting to replace conventional "Store" instructions, as known to one of ordinary skill in the art, with modified "BufferedStore" instructions to take advantage of the buffered data store 112. A BufferedStore instruction causes information to be stored in a cache line of an isolated memory region as with a conventional "Store" instruction, but also updates the write mask for the cache line to set corresponding bits for each updated byte. Accordingly, non-null write masks indicate that associated cache lines contain buffered data. In some embodiments, analysis may be performed to find Store instructions that are provably thread-private. Such Store instructions may be left intact instead of being replaced by BufferedStore instructions, in order to increase the effective capacity of the buffered data store 112.

In some embodiments, a coherence controller 118 is provided. The coherence controller 118 is configured to propagate changes between isolated memory regions 120-122, when appropriate. Though illustrated and described herein as a separate logical block, in some embodiments, at least some of the functionality of the coherence controller 118 may be performed by a portion of the isolated memory regions 120-122, and/or may be performed by a portion of the execution pipelines 124-126 and associated hardware. In some embodiments, the coherence controller 118 may implement a conventional MOESI cache coherence protocol, with modifications to help support deterministic execution and BufferedStore instructions.

Broadly speaking, the modifications to the conventional MOESI cache coherence protocol help ensure that the isolated memory regions 120-122 do not share data with each other during an execution quantum, and then that any updates are merged deterministically at the end of the quantum. Even though cache lines may temporarily become incoherent, they will be merged deterministically at the end of the quantum. With regard to particular modifications, in some embodiments, if the coherence controller 118 receives a request from a first isolated memory region for a cache line held by a second isolated memory region, and if the write mask of the cache line in the second isolated memory region is not null, the request is NACKed, and the coherence controller 118 provides the requested data from main memory 128. This helps guarantee that buffered data is not shared between isolated memory regions 120-122. In some embodiments, the coherence controller 118 ensures that a cache line is in the Shared state before the cache line may be written by a BufferedStore instruction. Also, in some embodiments, the coherence controller 118 moves cache lines to the Owned state after they have been published during the commit protocol.

In some embodiments, when processing a Store instruction to a cache line that is in a non-buffered state, the conventional MOESI protocol is followed. When processing a Store instruction to a cache line that is in a buffered state, the Store is treated like a BufferedStore. Further, the coherence controller 118 may use a modified cache eviction policy, in which unwritten cache lines are preferentially evicted from a set, so that a larger number of BufferedStore instructions may be handled before the end of an execution quantum is triggered by filling up the isolated memory region.

In some embodiments, a deterministic runtime library 104 and a deterministic synchronization library 106 are provided. In some embodiments, functionality of the deterministic runtime library 104 and the deterministic synchronization library 106 may be provided by a single library. The deterministic runtime library 104 and deterministic synchronization library 106 may be used by an executable user program 102 for threading and synchronization functionality as if they were conventional libraries such as pthreads and/or the like. The deterministic runtime library 104 includes functionality similar to a conventional threading library, but inserts hooks into thread create and thread destroy procedures to ensure that such activities happen in a deterministic manner. The deterministic synchronization library 106 is similar to a conventional synchronization library, but provides access to locks, mutexes, and/or the like in a deterministic manner. Further details of the operation of the deterministic runtime library 104 and the deterministic synchronization library 106 are provided further below.

In some embodiments, the executable user program 102 may be a conventional multithreaded user program. That is, the executable user program 102 may not need to be modified, other than linking to the deterministic runtime library 104 and deterministic synchronization library 106 at either link time or run time, to be executed in a deterministic manner by the computing device 100. In some embodiments, the executable user program 102 may be instrumented as described above to provide an instruction count, but otherwise may not need to be further modified other than linking to the deterministic runtime library 104 and deterministic synchronization library 106. Accordingly, the computing device 100 may easily be used to execute any executable user program 102 in a deterministic manner, even if the executable user program 102 was not originally designed to support deterministic execution.

In some embodiments, the computing device 100 may include an isolated memory space monitor 108. The isolated memory space monitor 108 may include a hardware portion configured to trigger a BufferFull user-level trap upon detecting an isolated memory region overflow. A software portion of the isolated memory space monitor 108 may, in response to the BufferFull user-level trap, cause an end-of-quantum event to be generated for a thread accessing the overflowing isolated memory region. In some embodiments, the isolated memory space monitor 108 may be implemented solely in software. In some embodiments, if the isolated memory regions are located solely in main memory 128, an isolated memory space monitor 108 may not be used, as the storage space within main memory 128 may be much larger than storage space within a cache memory such as an L1 cache. In such embodiments, running out of space in the isolated memory regions is unlikely, and so it may not result in an end of quantum event.

In some embodiments, the computing device 100 may include an instruction count monitor 110. The instruction count monitor 110 may include a hardware-based instruction counting mechanism configured to count instructions as they retire, and to trigger a QuantumReached user-level trap upon reaching a predetermined number of instructions. A software-based portion of the instruction count monitor 110 may, in response to the QuantumReached user-level trap, cause an end-of-quantum event to be generated for the associated thread. In some embodiments, a threshold for the predetermined number of instructions may be configurable via software, and the hardware-based instruction counting mechanism may be enabled and/or disabled via software instructions. Any suitable threshold for the predetermined number of instructions may be used. In some embodiments, a number of instructions between 1,000 and 100,000 may be used. In some embodiments, a threshold of approximately 50,000 instructions may be used. In some embodiments, a threshold number of instructions may be determined dynamically, such as by repeated execution and performance measurement based on different threshold values.

In some embodiments, the number of instructions may be incremented non-uniformly based on types of instructions. For example, the number of instructions may be incremented by a larger amount for high latency instructions, such as stores that miss in the buffered data store 112, than for low latency instructions, such as simple arithmetic instructions.

Though instruction counting in hardware may be particularly efficient, in some embodiments, instruction counts and QuantumReached events may be generated in software alone. An executable user program 102 may be instrumented to increment the instruction count. In some embodiments, the number of instrumentation instructions added to the executable user program 102 may be minimized by counting instructions during instrumentation and then adding instrumentation instructions with larger totals, such as at the end of each basic block, and/or the like.

Figure 2:
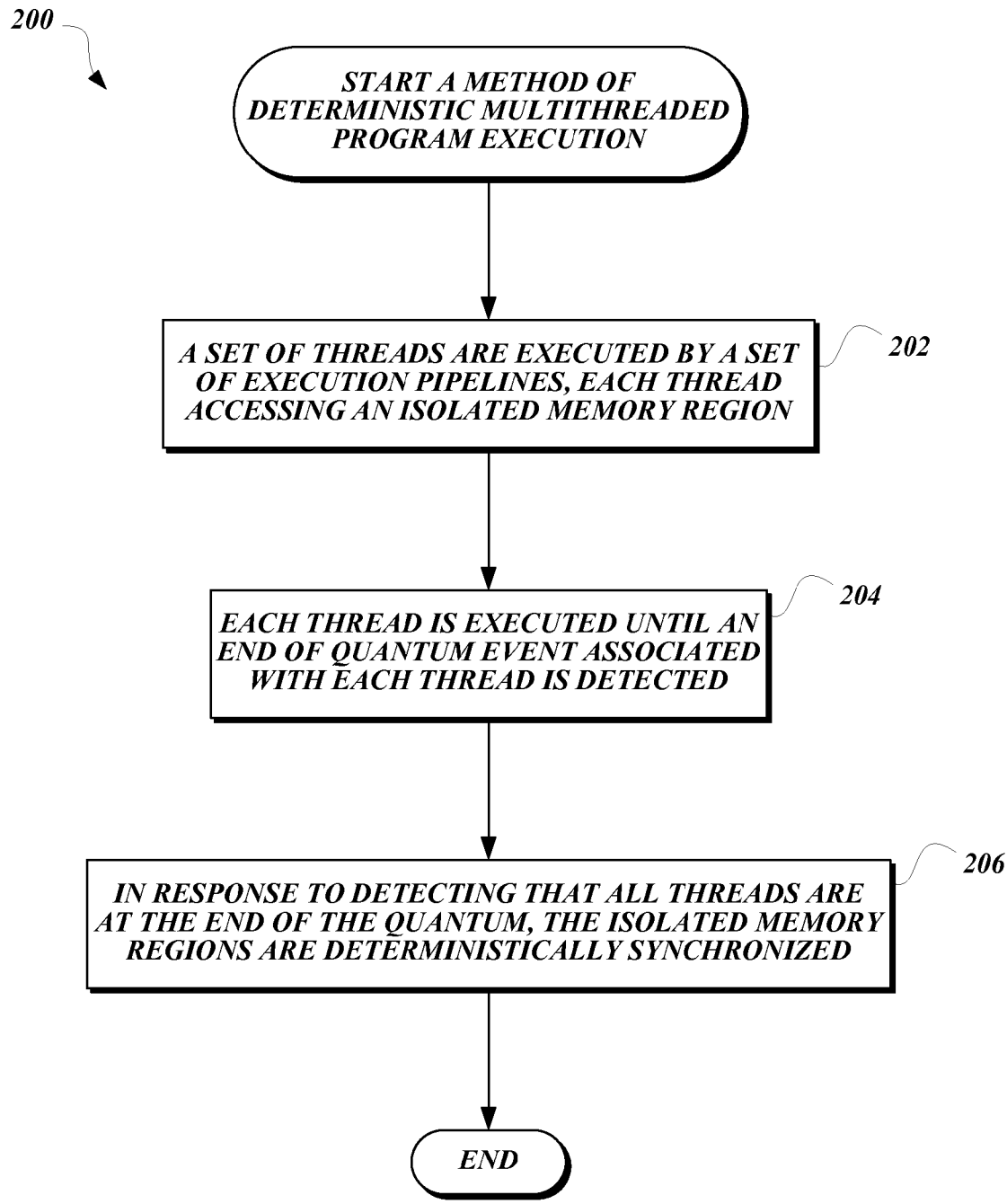
FIG. 2 is a flowchart that illustrates an exemplary embodiment of a method of deterministic multithreaded program execution according to various aspects of the present disclosure.

FIG. 2 is a flowchart that illustrates an exemplary embodiment of a method 200 of deterministic multithreaded program execution according to various aspects of the present disclosure. The method 200 is a high-level description of an exemplary embodiment of how the computing device 100 may provide deterministic multithreaded program execution. From a start block, the method 200 proceeds to block 202, where a set of threads are executed by a set of execution pipelines, such as execution pipelines 124, 126. Each thread accesses an isolated memory region, such as isolated memory regions 120, 122. In some embodiments, the set of threads may include a number of threads that is less than or equal to a number of execution pipelines 124, 126. In such embodiments, the isolated memory regions 120, 122 may all be hardware-based isolated memory regions, such as L1 cache memories and/or the like. In some embodiments, the set of threads may include a number of threads that is greater than a number of execution pipelines 124, 126. In such embodiments, at least one of the isolated memory regions 120, 122 may be provided in main memory 128 or in some other computer-readable medium. Further, in such embodiments, the memory region provided in main memory 128 may be swapped into a hardware-based isolated memory region when an associated thread is executed by an execution pipeline associated with the hardware-based isolated memory region.

The threads execute during a period of time that may be called an execution quantum. At block 204, each thread is executed until an end of quantum event associated with each thread is detected. In some embodiments, any of three conditions may cause an end of quantum event to be detected by an executing thread: the instruction count monitor 110 may detect that a predetermined number of instructions have been executed by the thread; the isolated memory space monitor 108 may determine that an isolated memory region associated with the execution pipeline executing the thread is full; or the deterministic synchronization library 106 may detect inter-thread communication. In some embodiments, a thread create instruction or a thread destroy instruction may also cause an end of quantum event to be detected. When an end of quantum event associated with a given thread is detected, the thread checks if all other threads have also detected end of quantum events. If not, the thread waits until all other threads have also reached the end of the quantum. Then, at block 206, in response to detecting that all threads are at the end of the quantum, the isolated memory regions are deterministically synchronized. The method 200, as illustrated, then proceeds to an end block and terminates, though in many embodiments, the method 200 would start a new execution quantum and return to block 202.

Figure 3:
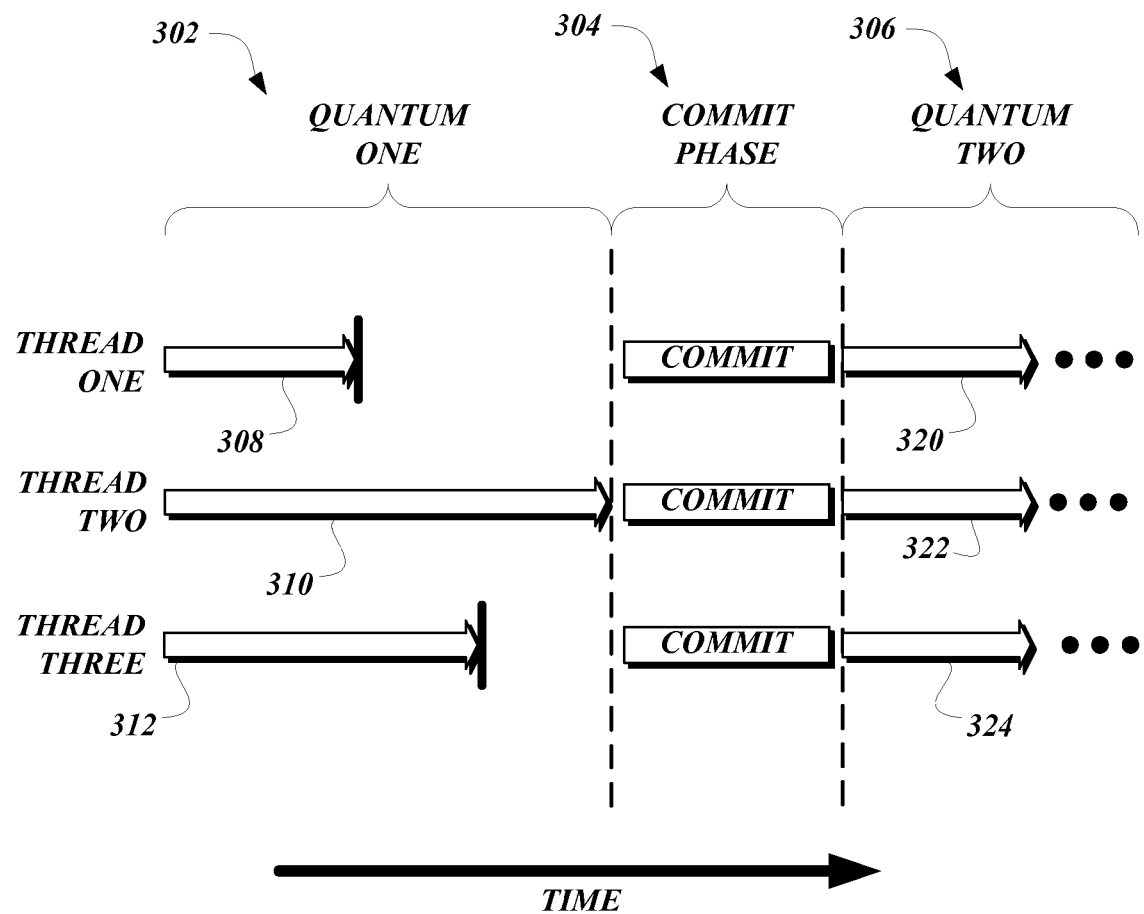
FIG. 3 illustrates one embodiment of three threads executing via a method similar to the method illustrated in FIG. 2.

FIG. 3 illustrates one embodiment of three threads executing via a method similar to the method 200 described above. A first thread 308, a second thread 310, and a third thread 312 each begin executing during a first quantum 302. During the first quantum 302, each thread communicates with its own isolated memory region. As time passes and the threads are executed, each thread experiences an end of quantum event at a different time, as indicated by the vertical bars at the end of the arrows representing the execution of the first thread 308 and the third thread 312. After each of these two threads experiences the end of quantum event, it determines that other threads are still executing, and so they wait. Once the second thread 310 experiences an end of quantum event, all threads have experienced end of quantum events. Hence, the first quantum 302 ends, and a commit phase 304 begins. During the commit phase 304, changes made to each isolated memory region are committed to main memory 128 (and/or other shared memory), and/or the isolated memory regions may exchange data updates via the coherence controller 118. In some embodiments, the deterministic runtime library 104 may create new threads or destroy existing threads during the commit phase 304. Once changes are communicated as appropriate, the isolated memory regions are once again isolated from each other, and a second quantum 306 begins. The first thread 320, second thread 322, and third thread 324 proceed as before until each thread experiences another end of quantum event.

Figure 4A:
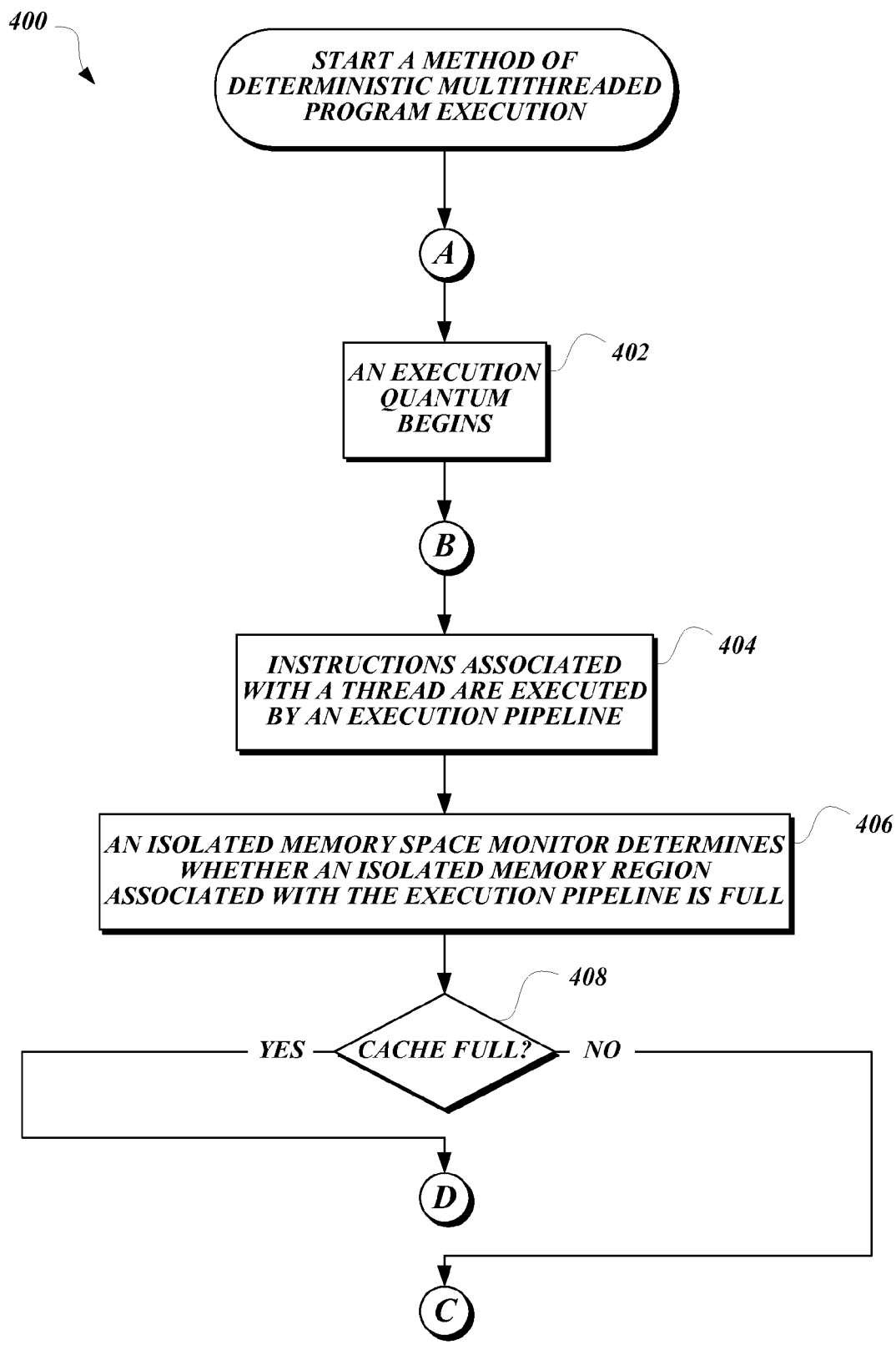
FIGS. 4A-4C are a flowchart that illustrates an exemplary embodiment of a method of deterministic multithreaded program execution according to various aspects of the present disclosure.
Figure 4B:
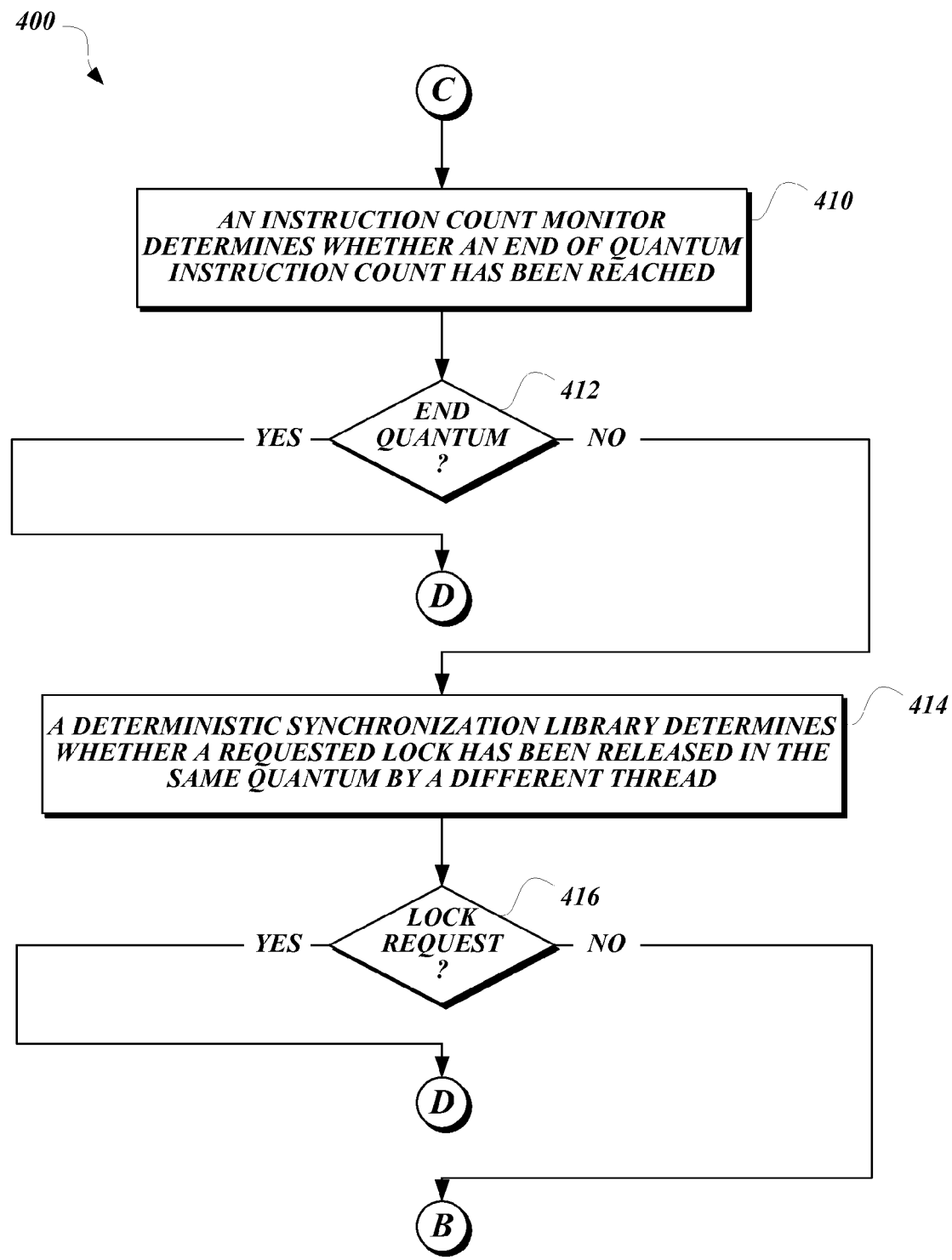
Figure 4C:
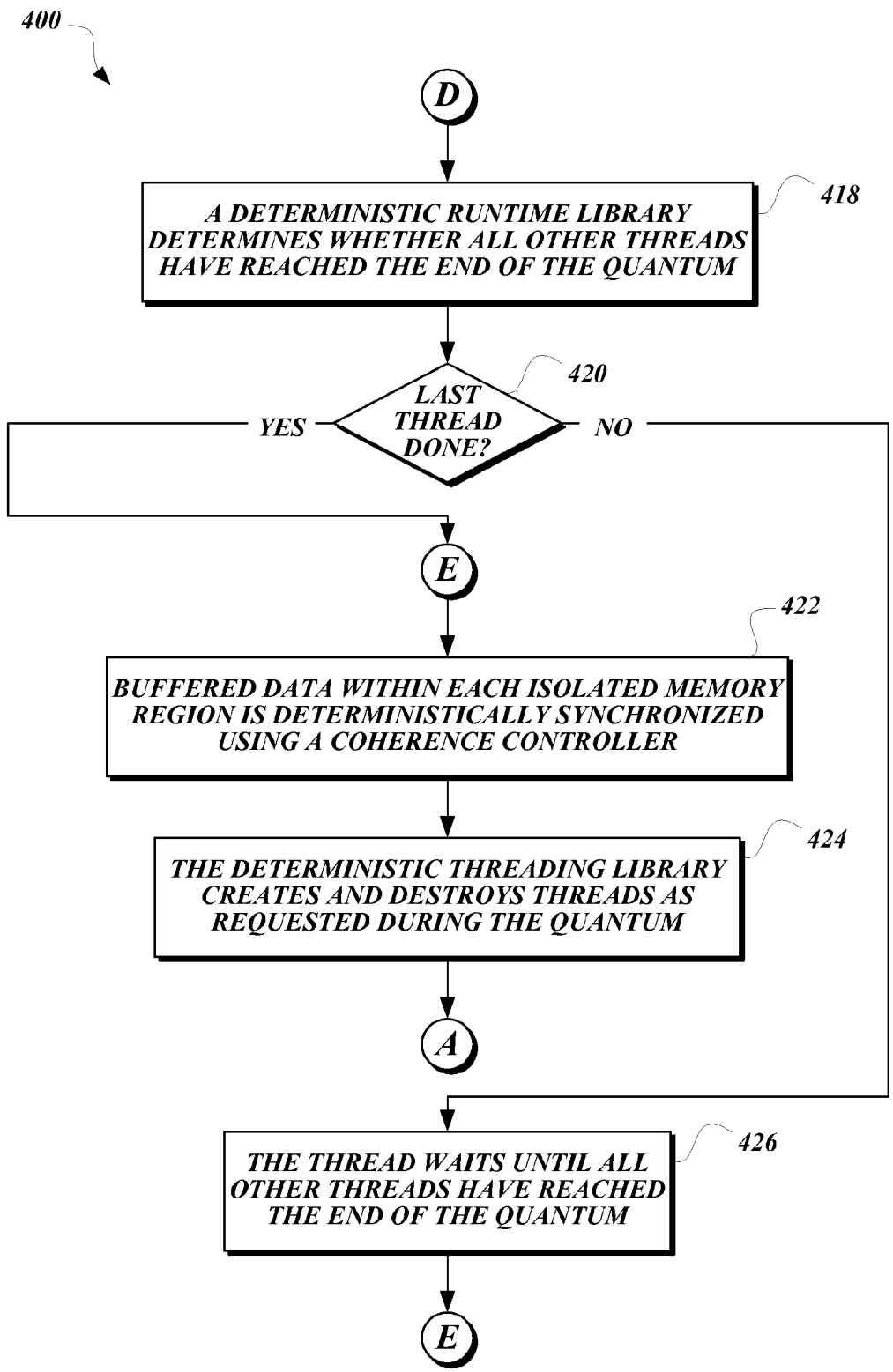

FIGS. 4A-4C are a flowchart that illustrates an exemplary embodiment of a method 400 of deterministic multithreaded program execution according to various aspects of the present disclosure. The method 400 may be similar to the method 200 described above with respect to FIG. 2, but is illustrated and discussed in greater detail. From a start block, the method 400 proceeds to a continuation terminal ("terminal A"), and then to block 402, where an execution quantum begins. In some embodiments, a global variable identifying the current quantum may be incremented by the deterministic synchronization library 106 at the start of the execution quantum. The method 400 then proceeds to another continuation terminal ("terminal B"), and then to block 404, where instructions associated with a thread are executed by an execution pipeline. The method 400 is illustrated and described primarily from the perspective of a single thread executed by a given execution pipeline for ease of discussion, but one of ordinary skill in the art will understand that other execution pipelines may concurrently be executing other threads. For ease of discussion in referring back to FIG. 1, the discussion below will assume that the thread is being executed by execution pipeline one 124 and is accessing isolated memory region one 120, but in other embodiments, the thread may be executing on any execution pipeline and accessing the appropriate isolated memory region.

In block 406, an isolated memory space monitor 108 determines whether the isolated memory region 120 associated with the execution pipeline 124 is full. In some embodiments, the isolated memory space monitor 108 may make this determination after receiving a BufferFull trap from the hardware. The BufferFull trap may be generated when the isolated memory region 120 or the coherence controller 118 determines that a cache line must be evicted, yet all cache lines in the isolated memory region 120 contain buffered data. The method 400 then proceeds to a decision block 408, where a choice is made based on whether the isolated memory space was determined to be full. If the choice at decision block 408 is YES, then the method 400 proceeds to a continuation terminal ("terminal D") to begin end-of-quantum processing. If the choice at decision block 408 is NO, then the method 400 proceeds to a continuation terminal ("terminal C").

From terminal C (FIG. 4B), the method 400 proceeds to block 410, wherein an instruction count monitor 110 determines whether an end of quantum instruction count has been reached. In some embodiments, the instruction count monitor 110 may make this determination after receiving a Quantum-Reached trap from a hardware instruction counting mechanism, as is discussed above. In some embodiments, the instruction count monitor 110 may make this determination by inspecting an instruction counter incremented by instructions inserted into the thread during instrumentation and comparing it to a predetermined threshold, as is also discussed above. At decision block 412, a choice is made based on whether the instruction count monitor 110 has determined whether the end of the quantum has been reached. If the choice at decision block 412 is YES, then the method 400 proceeds to a continuation terminal ("terminal D") to begin end-of-quantum processing.

If the choice at decision block 412 is NO, then the method 400 proceeds to block 414, where a deterministic synchronization library 106 determines whether a requested lock has been released in the same quantum by a different thread. That is, the deterministic synchronization library 106 receives a request to acquire a lock, as is understood to one of ordinary skill in the art. The deterministic synchronization library 106 retrieves information from the lock data store 114 indicating an identity of the last thread to have released the lock. If the last thread to have released the lock is the same thread that is now requesting the lock, then the lock request may be granted, as it does not represent inter-thread communication that could violate determinism guarantees. If the last thread to have released the lock is a different thread from the thread that is now requesting the lock, then the deterministic synchronization library 106 retrieves information from the lock data store 114 indicating a quantum in which the different thread released the lock. If the lock was released in a previous quantum, then the lock request may be granted, as the data protected by the lock would have been committed during a previous commit phase. If the lock was released in the current quantum, then the lock request may cause a quantum end event to be detected, as the data protected by the lock may have been updated in an isolated memory region inaccessible to the requesting thread.

At decision block 416, a choice is made based on whether the lock request caused a quantum end event to be detected based on the above criteria. If the choice at decision block 416 is YES, then the method 400 proceeds to a continuation terminal ("terminal D") to begin end-of-quantum processing. If the choice at decision block 416 is NO, then a quantum end event has not been detected, and execution of the thread may continue. Hence, the method 400 returns to terminal B (FIG. 4A), where the thread continues to execute and check for end-of-quantum events.

From terminal D (FIG. 4C), the method 400 proceeds to block 418, where the deterministic runtime library 104 determines whether all other threads have reached the end of the quantum. At decision block 420, a choice is made based on the determination of whether all other threads have reached the end of the quantum. If not all other threads have reached the end of the quantum, the choice at decision block 420 is NO, and the method 400 proceeds to block 426, where the thread waits until all other threads have reached the end of the quantum. In some embodiments, the thread may pause an instruction count associated with the thread, and may busy wait while repeatedly checking the status of the other threads. Once the thread determines that all other threads have reached the end of the quantum, the method 400 proceeds to a continuation terminal ("terminal E").

If all other threads have reached the end of the quantum, the choice at decision block 420 is YES, and the method 400 proceeds directly to terminal E, and then to block 422, where buffered data within each isolated memory region is deterministically synchronized. In some embodiments, the coherence controller 118 may commit each cache line in each isolated memory region 120-122. The coherence controller 118 then collects values for the cache line from other isolated memory regions 120-122, whether in dedicated cache memories or in portions of the buffered data store 112 residing in main memory 128. The coherence controller 118 deterministically merges the values based on a deterministic order ID obtained along with the values, and publishes the merged value to main memory 128. In some embodiments, the deterministic merge is accomplished using a z-buffer algorithm and/or the like.

The method 400 then proceeds to block 424, where the deterministic runtime library 104 creates and destroys threads as requested during the quantum. That is, if a create thread or destroy thread instruction caused an end of quantum event for a given thread, the deterministic runtime library 104 proceeds to create or destroy threads as requested in a deterministic manner before the start of the next quantum. The method 400 then returns to terminal A (FIG. 4A), where the next quantum begins. Eventually, when all threads have finished all work and the executable user program 102 exits, the method 400 terminates.

Though the description of the method 400 above may have suggested that the tests for various quantum end events happen in a particular order for ease of discussion, in some embodiments, these tests may occur in other orders. In some embodiments, the tests are not repeated until one fails, but instead, the tests are initiated asynchronously. For example, in such embodiments, the method 400 may continue executing the thread without performing any tests until a Quantum-Reached user-level trap is generated, at which point the method 400 may proceed to block 410 to handle the end of quantum instruction count. As another example, the method 400 may continue executing the thread without performing any tests until a BufferFull user-level trap is generated, at which point the method 400 may proceed to block 406 to handle the full isolated memory region.

While illustrative embodiments have been illustrated and described, it will be appreciated that various changes can be made therein without departing from the spirit and scope of the claimed subject matter.

The embodiments of the invention in which an exclusive property or privilege is claimed are defined as follows:

1. A computer-implemented method of deterministic multithreaded execution, the method comprising:
   executing one or more threads via one or more execution pipelines, wherein each thread is configured to access an isolated memory region; and
   in response to determining that all of the one or more threads have detected end of execution quantum events, synchronizing the isolated memory regions;
   wherein the end of execution quantum events include an instruction count event, wherein the instruction count event indicates execution of a predetermined number of machine instructions by a thread, and wherein the number of machine instructions includes memory instructions and arithmetic instructions.

2. The computer-implemented method of claim 1, further comprising tracking a number of machine instructions executed by the thread.

3. The computer-implemented method of claim 2, wherein tracking a number of machine instructions executed by the thread includes incrementing an instruction count by an amount based on a type of instruction executed by the thread.

4. The computer-implemented method of claim 1, wherein the end of execution quantum events include a memory full event, wherein the memory full event indicates the isolated memory region associated with a thread is full.

5. The computer-implemented method of claim 1, wherein the end of execution quantum events include a lock request event, wherein the lock request event indicates that a thread requested a lock that had previously been released by a different thread during a current quantum.

6. The computer-implemented method of claim 1, wherein synchronizing each of the isolated memory regions includes merging contents of the isolated memory regions using a z-buffer algorithm.

7. The computer-implemented method of claim 1, wherein a number of threads in the one or more threads is greater than a number of execution pipelines in the one or more execution pipelines.

8. A non-transitory computer-readable medium having computer-executable instructions stored thereon that, if executed by one or more processors of a computing device, cause the computing device to perform the method of claim 1.

9. A computing device configured to deterministically execute multiple concurrent threads, the computing device comprising:
   a set of isolated memory regions;
   at least one execution pipeline, wherein each execution pipeline of the at least one execution pipelines is associated with an isolated memory region of the set of isolated memory regions; and
   a physical computer-readable medium having computer-executable instructions stored thereon that, in response to execution by the computing device, cause the computing device to provide:
   an isolated memory space monitor configured to detect a state wherein at least one isolated memory region is full;
   an instruction count monitor configured to detect execution of a predetermined number of processing instructions by a thread; and
   a deterministic synchronization library configured to detect a request by a thread for a lock previously released by a different thread during a current execution quantum.

10. The computing device of claim 9, wherein the computing device further comprises a coherence controller, and wherein the coherence controller is configured to refrain from synchronizing contents of the isolated memory regions until an end of an execution quantum is detected.

11. The computing device of claim 10, wherein each isolated memory region includes at least one private cache associated with one of the execution pipelines.

12. The computing device of claim 11, wherein the at least one private cache includes an L1 cache.

13. The computing device of claim 10, wherein each isolated memory region comprises a plurality of cache lines, and wherein each cache line is associated with a write mask.

14. The computing device of claim 13, wherein the coherence controller is configured to synchronize contents of the isolated memory regions using a modified MOESI cache coherence protocol, wherein:
   the coherence controller is configured to respond to requests for a cache line having a non-null write mask with a NACK;
   the coherence controller is configured to transition a cache line to a shared state before writing to the cache line; and
   the coherence controller is configured to transition a cache line to an owned state after publishing contents of the cache line.

15. The computing device of claim 14, further comprising a directory data store configured to store information regarding buffered versions of cache lines, wherein the coherence controller is configured to deterministically merge cache lines buffered in more than one isolated memory region based on information stored in the directory data store.

16. The computing device of claim 9, wherein each execution pipeline is configured to update an instruction count upon executing one or more instructions, and wherein the instruction count monitor is configured to receive an instruction count trap from an execution pipeline in response to the execution pipeline detecting that the instruction count for a thread has exceeded a threshold.

17. The computing device of claim 9, wherein the instruction count monitor is configured to receive an instruction count value from an executable user program that has been instrumented to provide instruction counts during execution.

18. The computing device of claim 9, wherein the isolated memory space monitor is configured to receive a buffer full trap from an isolated memory region in response to a memory region full condition being detected.

19. The computing device of claim 9, further comprising at least one buffered data store configured to store information from an isolated memory region for a thread that is not currently being executed by an execution pipeline.

20. A computer-implemented method of deterministic multithreaded execution, the method comprising:
   executing one or more threads via one or more execution pipelines, wherein each thread is configured to access an isolated memory region; and
   in response to determining that all of the one or more threads have detected end of execution quantum events, synchronizing the isolated memory regions,
   wherein the end of execution quantum events include a lock request event, and
   wherein the lock request event indicates that a thread requested a lock that had previously been released by a different thread during a current quantum.

* * * * *